US010761276B2

(12) United States Patent
Hemenway et al.

(10) Patent No.: US 10,761,276 B2
(45) Date of Patent: Sep. 1, 2020

(54) PASSIVELY ALIGNED CROSSED-CYLINDER OBJECTIVE ASSEMBLY (71) Applicant: nLIGHT, Inc., Vancouver, WA (US)

(72) Inventors: David Martin Hemenway, Beaverton, OR (US); Aaron Brown, Vancouver, WA (US); David C. Dawson, Brush Prairie, WA (US); Kylan Hoener, Portland, OR (US); Shelly Lin, Battle Ground, WA (US); Wolfram Urbanek, Camas, WA (US)

(73) Assignee: nLIGHT, Inc., Vancouver, WA (US)

( * ) Notice: Subject to any disclaimer, the term of this patent is extended or adjusted under 35 U.S.C. 154(b) by 683 days.

(21) Appl. No.: 15/154,663

(22) Filed: May 13, 2016

(65) Prior Publication Data

US 2016/0334588 A1 Nov. 17, 2016

Related U.S. Application Data (60) Provisional application No. 62/162,535, filed on May 15, 2015.

(51) Int. Cl.
G02B 6/42 (2006.01)
G02B 13/08 (2006.01)

(52) U.S. Cl.
CPC ......... *G02B 6/4206* (2013.01); *G02B 6/4244* (2013.01); *G02B 13/08* (2013.01)

(58) Field of Classification Search
CPC .............................. G02B 6/4206; G02B 6/4244
See application file for complete search history.

(56) References Cited

U.S. PATENT DOCUMENTS

| 3,410,630 | A | * | 11/1968 | Jacobs ..................... G02B 7/02 |
| | | | | 359/644 |
| 3,622,906 | A | | 11/1971 | Nyul |
| 3,827,059 | A | | 7/1974 | Rambauske |
| 4,151,582 | A | | 4/1979 | Grunberger |
| 4,550,333 | A | | 10/1985 | Ridder et al. |
| 4,609,262 | A | | 9/1986 | Fujikawa et al. |

(Continued)

FOREIGN PATENT DOCUMENTS

| CN | 1829015 | 9/2006 |
| CN | 1975507 | 6/2007 |

(Continued)

OTHER PUBLICATIONS

International Preliminary Report on Patentability from International Application No. PCT/US2017/018210, dated Aug. 21, 2018, 8 pages.

(Continued)

*Primary Examiner* — Sung H Pak
*Assistant Examiner* — Hoang Q Tran
(74) *Attorney, Agent, or Firm* — Klarquist Sparkman, LLP (57) ABSTRACT

A cross-cylinder objective assembly includes a fast axis objective (FAO) situated along an optical axis for focusing an incident laser beam along a fast axis, a slow axis objective (SAO) situated along the optical axis for focusing the incident laser beam along a slow axis, and a lens cell having fast and slow axis objective receiving portions for registering the FAO and SAO at a predetermined spacing along the optical axis.

21 Claims, 7 Drawing Sheets (56) References Cited

U.S. PATENT DOCUMENTS

| | | | |
|---|---|---|---|
| 4,689,482 A | 8/1987 | Horikawa et al. | |
| 4,716,568 A | 12/1987 | Scifres et al. | |
| 4,719,631 A | 1/1988 | Conaway | |
| 4,828,357 A | 5/1989 | Arata et al. | |
| 5,048,911 A | 9/1991 | Sang et al. | |
| 5,077,750 A | 12/1991 | Pocholle et al. | |
| 5,105,430 A | 4/1992 | Mundinger et al. | |
| 5,168,401 A | 12/1992 | Endriz | |
| 5,181,224 A * | 1/1993 | Snyder | G02B 3/06 359/710 |
| 5,251,060 A | 10/1993 | Uenishi et al. | |
| 5,305,344 A | 4/1994 | Patel | |
| 5,319,528 A | 6/1994 | Raven | |
| 5,515,391 A | 5/1996 | Endriz | |
| 5,610,930 A | 3/1997 | Macomber et al. | |
| 5,668,822 A | 9/1997 | Tada | |
| 5,764,675 A | 6/1998 | Juhala | |
| 5,825,551 A | 10/1998 | Clarkson et al. | |
| 5,828,683 A | 10/1998 | Freitas | |
| 5,887,096 A | 3/1999 | Du et al. | |
| 5,898,211 A | 4/1999 | Marshall et al. | |
| 5,909,458 A | 6/1999 | Freitas et al. | |
| 5,986,794 A | 11/1999 | Krause et al. | |
| 5,987,043 A | 11/1999 | Brown et al. | |
| 6,028,722 A | 2/2000 | Lang | |
| 6,041,072 A | 3/2000 | Ventrudo et al. | |
| 6,044,096 A | 3/2000 | Wolak et al. | |
| 6,057,871 A | 5/2000 | Peterson | |
| 6,075,912 A | 6/2000 | Goodman | |
| 6,115,185 A | 9/2000 | Du et al. | |
| 6,124,973 A | 9/2000 | Du et al. | |
| 6,212,310 B1 | 4/2001 | Waarts et al. | |
| 6,229,831 B1 | 5/2001 | Nightingale et al. | |
| 6,240,116 B1 | 5/2001 | Lang et al. | |
| 6,266,359 B1 | 7/2001 | Taheri et al. | |
| 6,324,320 B1 | 11/2001 | Goodman | |
| 6,327,285 B1 | 12/2001 | Wang | |
| 6,377,410 B1 | 4/2002 | Wang et al. | |
| 6,440,778 B1 | 8/2002 | Okada et al. | |
| 6,462,883 B1 | 10/2002 | Wang et al. | |
| 6,552,853 B2 | 4/2003 | Goodman | |
| 6,556,352 B2 | 4/2003 | Wang et al. | |
| 6,636,538 B1 | 10/2003 | Stephens | |
| 6,673,699 B2 | 1/2004 | Hubbard et al. | |
| 6,680,800 B1 | 1/2004 | Schreiber et al. | |
| 6,683,727 B1 | 1/2004 | Goring et al. | |
| 6,700,709 B1 | 3/2004 | Fermann | |
| 6,710,926 B2 | 3/2004 | Beach et al. | |
| 6,765,725 B1 | 7/2004 | Fermann et al. | |
| 6,778,732 B1 | 8/2004 | Fermann | |
| 6,898,222 B2 | 5/2005 | Hennig et al. | |
| 6,903,863 B1 | 6/2005 | Carniel et al. | |
| 6,975,659 B2 | 12/2005 | Nagano et al. | |
| 7,420,996 B2 | 9/2008 | Schulte et al. | |
| 7,436,868 B2 | 10/2008 | Schulte et al. | |
| 7,443,895 B2 | 10/2008 | Schulte et al. | |
| 7,537,395 B2 | 5/2009 | Savage-Leuchs | |
| 7,586,963 B2 | 9/2009 | Schulte et al. | |
| 7,733,932 B2 | 6/2010 | Faybishenko | |
| 7,751,458 B2 | 7/2010 | Regaard et al. | |
| 7,764,723 B2 | 7/2010 | Ovtchinnikov et al. | |
| 7,830,608 B2 | 11/2010 | Hu | |
| 7,848,372 B2 | 12/2010 | Schulte et al. | |
| 7,947,517 B2 | 5/2011 | Hisa | |
| 8,000,360 B2 | 8/2011 | Faybishenko | |
| 8,066,389 B2 | 11/2011 | Silverstein et al. | |
| 8,126,028 B2 | 2/2012 | Clifford, Jr. | |
| 8,339,598 B2 | 12/2012 | Ban et al. | |
| 8,427,749 B2 | 4/2013 | Du et al. | |
| 8,432,945 B2 | 4/2013 | Faybishenko | |
| 8,437,086 B2 | 5/2013 | Du et al. | |
| 8,488,245 B1 | 7/2013 | Chann | |
| 8,508,729 B2 | 8/2013 | Ban et al. | |
| 8,553,221 B2 | 10/2013 | Volodin et al. | |
| 8,599,485 B1 | 12/2013 | Cobb | |
| 8,654,326 B2 | 2/2014 | Volodin et al. | |
| 8,711,894 B2 | 4/2014 | Chuyanov et al. | |
| 8,830,587 B2 | 9/2014 | Bhatia et al. | |
| 8,842,369 B2 | 9/2014 | Li | |
| 8,861,082 B2 | 10/2014 | Cobb | |
| 8,873,134 B2 | 10/2014 | Price et al. | |
| 8,891,579 B1 | 11/2014 | Price et al. | |
| 8,942,521 B2 | 1/2015 | Song et al. | |
| 9,005,262 B2 | 4/2015 | Liu et al. | |
| 9,373,932 B2 | 6/2016 | Hayamizu et al. | |
| 9,413,136 B1 | 8/2016 | Vethake et al. | |
| 9,455,552 B1 | 9/2016 | Price et al. | |
| 9,705,289 B2 | 7/2017 | Kanskar et al. | |
| 9,720,145 B2 | 8/2017 | Kanskar | |
| 10,261,261 B2 | 4/2019 | Hemenway et al. | |
| 2004/0114027 A1 | 6/2004 | Frith | |
| 2004/0252388 A1 | 12/2004 | Yamanaka et al. | |
| 2006/0165144 A1 | 7/2006 | Mikhailov et al. | |
| 2006/0280209 A1 | 12/2006 | Treusch | |
| 2007/0047401 A1 | 3/2007 | Sun | |
| 2007/0116071 A1 | 5/2007 | Schulte et al. | |
| 2007/0116077 A1 | 5/2007 | Farmer et al. | |
| 2007/0217467 A1 | 9/2007 | DeFranza et al. | |
| 2007/0217468 A1 | 9/2007 | DeFranza et al. | |
| 2007/0217469 A1 | 9/2007 | DeFranza et al. | |
| 2007/0217470 A1 | 9/2007 | DeFranza et al. | |
| 2007/0217471 A1 | 9/2007 | DeFranza et al. | |
| 2007/0236781 A1 | 10/2007 | Fidric | |
| 2007/0268572 A1 | 11/2007 | Hu | |
| 2007/0268945 A1 | 11/2007 | Schulte et al. | |
| 2007/0268946 A1 | 11/2007 | Schulte et al. | |
| 2007/0268947 A1 | 11/2007 | Schulte et al. | |
| 2008/0019010 A1 | 1/2008 | Govorkov et al. | |
| 2009/0323752 A1 * | 12/2009 | Chuyanov | G02B 6/4206 372/50.12 |
| 2010/0158060 A1 | 6/2010 | Faybishenko | |
| 2010/0226405 A1 | 9/2010 | Chuyanov et al. | |
| 2013/0148684 A1 | 6/2013 | Guo et al. | |
| 2013/0162956 A1 | 6/2013 | Okuda | |
| 2013/0194801 A1 | 8/2013 | Wolf et al. | |
| 2014/0036375 A1 | 2/2014 | Chann et al. | |
| 2014/0236022 A1 * | 8/2014 | Zeng | A61B 1/00172 600/476 |
| 2014/0300971 A1 | 10/2014 | Wolak et al. | |
| 2015/0003484 A1 | 1/2015 | Muendel | |
| 2015/0131692 A1 | 5/2015 | Hayamizu et al. | |
| 2015/0280404 A1 | 10/2015 | Kasai et al. | |
| 2015/0295386 A1 | 10/2015 | Hemenway et al. | |
| 2015/0349481 A1 | 12/2015 | Kliner | |
| 2016/0181764 A1 | 6/2016 | Kanskar et al. | |
| 2016/0322777 A1 | 11/2016 | Zediker et al. | |
| 2017/0271837 A1 | 9/2017 | Hemenway et al. | |
| 2018/0183214 A1 | 6/2018 | Dawson et al. | |
| 2019/0212497 A1 | 7/2019 | Hemenway et al. | |
| 2019/0221990 A1 | 7/2019 | Hemenway et al. | |
| 2019/0252863 A1 | 8/2019 | Chen et al. | |

FOREIGN PATENT DOCUMENTS

| | | |
|---|---|---|
| CN | 101141051 | 3/2008 |
| CN | 101144909 | 3/2008 |
| CN | 201113224 | 9/2008 |
| CN | 101707326 | 5/2010 |
| CN | 201515142 | 6/2010 |
| CN | 102052608 | 5/2011 |
| CN | 102074896 | 5/2011 |
| CN | 102089943 | 6/2011 |
| CN | 102437509 | 5/2012 |
| CN | 202548385 | 11/2012 |
| CN | 202720390 | 2/2013 |
| CN | 203071399 | 7/2013 |
| CN | 103368066 | 10/2013 |
| CN | 103401136 | 11/2013 |
| EP | 0721113 | 7/1996 |
| JP | 2008-109083 | 5/2008 |

(56) References Cited

FOREIGN PATENT DOCUMENTS

| RU | 2010143026 | 4/2012 |
|---|---|---|
| WO | WO 2005059626 | 6/2005 |

OTHER PUBLICATIONS

International Search Report and Written Opinion for related International Application No. PCT/US2017/023067, 12 pages, dated Jun. 27, 2017.
Chinese Office Action for Chinese Application No. 201610322260.X, dated Jun. 28, 2019, 21 pages. (includes English-language translation).
Lens Cell, Crossed Cylinders, Pearl Drawing, 1 page (Feb. 22, 2007).
International Search Report and Written Opinion from International Application No. PCT/US2017/018210, dated May 8, 2017, 12 pages.
Edwin, "Stripe Stacker for Use with Laser Diode Bars," Optics Letters, 20:222-224 (Jan. 15, 1995).
International Search Report and Written Opinion for International Application No. PCT/US2015/019288, dated Jun. 10, 2015.

\* cited by examiner

PASSIVELY ALIGNED CROSSED-CYLINDER OBJECTIVE ASSEMBLY

CROSS REFERENCE TO RELATED APPLICATION

This application claims the benefit of U.S. Provisional Application No. 62/162,535, entitled "PASSIVELY ALIGNED CROSSED CYLINDER OBJECTIVE ASSEMBLY" and filed May 15, 2015, which is incorporated herein by reference.

FIELD

The disclosure pertains to laser diode packages.

BACKGROUND

Conventional laser diode packages typically include one or more edge-emitting semiconductor diode lasers which emit beams with an asymmetric divergence and an asymmetric beam parameter product. Often times, these multiple laser diodes emit beams which propagate parallel to each other or which are made to propagate parallel through various optics. Separate fast axis and slow axis collimation optics collimate the beams along corresponding beam fast and slow axes. A circularly symmetric, plano-convex objective lens is typically situated to receive the collimated beams and to focus the beams into an optical fiber. Unfortunately, a plano-convex objective lens does not allow independent control or optimization of brightness associated with the beam fast and slow axes. Including separate control with one or more additional optics can introduce unacceptable cost and complexity. Such additional optics also make beam alignment more difficult, requiring additional labor and complex fixturing, and resulting in an increased chance of errors or defects. Thus, a need remains for innovation in laser diode packages without the aforementioned drawbacks.

SUMMARY

According to one aspect, a cross-cylinder objective assembly includes a fast axis objective (FAO) situated along an optical axis for focusing an incident laser beam along a fast axis, a slow axis objective (SAO) situated along the optical axis for focusing the incident laser beam along a slow axis, and a lens cell having fast and slow axis objective receiving portions for registering the FAO and SAO at a predetermined spacing along the optical axis.

According to a further aspect, the cross-cylinder objective assembly further includes wherein the lens cell receiving portion defines a lens cell aperture through which an annular portion of the lens cell is insertable towards the optical fiber receiving end so that the annular portion registers to the lens cell aperture and inhibits translation of the lens cell transverse to the optical axis, the lens cell receiving portion includes a rotation inhibiting surface which registers against a rotation inhibiting surface of the lens cell and inhibits rotation of the lens cell about the optical axis, the lens cell receiving portion includes an insertion surface that registers against an insertion surface of the lens cell and inhibit translation of the lens cell along the optical axis.

According to another aspect, a method includes selecting a lens cell from a plurality of different lens cells, each lens cell including an optical mount registering portion for registering the lens cell to a common optical mount associated with an optical axis, a fast axis objective (FAO) receiving portion for registering and securing an FAO to the lens cell, and a slow axis objective (SAO) receiving portion for registering and securing an SAO to the lens cell, wherein each lens cell is different from each other lens cell by one or more of a spacing between the FAO receiving portion and the optical mount registering portion along the optical axis and a spacing between the SAO receiving portion and the optical mount registering portion along the optical axis.

According to another aspect, a diode laser package includes a mount including a focusing volume extending between opposite lens cell and fiber receiving portions, the portions associated with an optical axis and defining corresponding apertures, an optical fiber secured in relation to the fiber receiving portion aperture so that an input face of the optical fiber is situated in the focusing volume at a selected position along and coaxial about the optical axis, a lens cell registered to the lens cell receiving portion of the mount so as to inhibit rotation of the lens cell about the optical axis and to inhibit translation of the lens cell in one or both directions along the optical axis, the lens cell including a fast axis objective (FAO) receiving portion and a slow axis objective (SAO) receiving portion, an FAO having an FAO focal axis and registered to the FAO receiving portion so as to inhibit rotation of the FAO in relation to the optical axis and to inhibit translation of the FAO in one or both directions along the optical axis and perpendicular to the FAO focal axis, and an SAO having an SAO focal axis and registered to the SAO receiving portion so as to inhibit rotation of the SAO in relation to the optical axis and to inhibit translation of the SAO in one or both directions along the optical axis and perpendicular to the SAO focal axis.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," "horizontal," "vertical," and the like. These terms are used for convenient description, but do not imply any particular spatial orientation.

As used herein, optical radiation refers to electromagnetic radiation at wavelengths of between about 100 nm and 10 µm, and typically between about 500 nm and 2 µm. Examples based on available laser diode sources and optical fibers generally are associated with wavelengths of between about 600 nm and 1700 nm. In some examples, propagating optical radiation is referred to as one or more beams having diameters, beam cross-sectional areas, and beam divergences that can depend on beam wavelength and the optical systems used for beam shaping. For convenience, optical radiation is referred to as light in some examples, and need not be at visible wavelengths.

Typical laser diodes have emission regions having non-circular cross-sections. An emission region of a laser diode can be associated with a slow axis that is directed along a longest dimension of the emission region and a fast axis that is directed along a shortest dimension of the emission region. Along the slow axis, an emitted beam tends to have a smaller angular divergence than the angular divergence along the fast axis. In addition, the slow axis tends to be associated with beam propagation in more transverse modes than beam propagation in the fast axis so that a beam parameter product (corresponding to a product of an angular divergence and a one-half beam dimension) measured along the slow axis is larger than that measured along the fast axis. Beam divergences and diameters along the slow axis, the fast axis, or both can be adjusted with one or more lenses, prisms, or mirrors to provide selected beam characteristics which can be optimized for various applications.

Representative embodiments are described with reference to optical fibers, which are typically assumed to be rotationally symmetric in cross-section, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences, but they need not be confined to materials made of silica. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

As used herein, numerical aperture (NA) refers to a largest angle of incidence with respect to a propagation axis defined by an optical waveguide for which propagating optical radiation is substantially confined. In optical fibers, fiber cores and fiber claddings can have associated NAs, typically defined by refractive index differences between a core and cladding layer, or adjacent cladding layers, respectively. While optical radiation propagating at such NAs is generally well confined, associated electromagnetic fields such as evanescent fields typically extend into an adjacent cladding layer. In some examples, a core NA is associated with a core/inner cladding refractive index, and a cladding NA is associated with an inner cladding/outer cladding refractive index difference. For an optical fiber having a core refractive index $n_{core}$ and a cladding index $n_{clad}$, a fiber core NA is $NA=\sqrt{n_{core}^2-n_{clad}^2}$. For an optical fiber with an inner core and an outer core adjacent the inner core, a cladding NA is $NA=\sqrt{n_{inner}^2-n_{outer}^2}$, wherein $n_{inner}$ and $n_{outer}$ are refractive indices of the inner cladding and the outer cladding, respectively. Optical beams as discussed above can also be referred to as having a beam NA which is associated with a beam angular radius. While multi-core step index fibers are described below, gradient index designs can also be used.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. The term brightness is used herein generally to refer to optical beam power divided by the square of the product of the beam radius and divergence.

Optical beams and optical elements are described in some examples with respect to one or more axes. Typically, an axis includes one or more straight line segments along which an optical beam propagates or along which one or more optical elements are situated. Such axes can be bent or folded with reflective surfaces, so that axes need not be single straight line segments. Various lenses are described or may be used, including convex-convex, plano-convex, concave-concave, plano-concave, cylindrical, fresnel, zone plates, holographic, spherical, aspheric, combinations thereof, etc. In convenient examples, cylindrical lenses have cylindrical surfaces that are arranged perpendicular to each other to provide a cross-cylinder (crossed-cylinder) lens or lens assembly. In typical examples, plano-convex cylindrical lenses have a plano surface and a cylindrically convex surface that define focal axes that can be parallel to or collinear with an axial center of curvature associated with the cylindrically convex surface. Beams are typically incident to such lenses parallel to an optical axis that is perpendicular to the plano or curved surfaces of the lens. Such beams tend to focus along an axis (e.g., slow axis, fast axis) perpendicular to the focal axes and optical axis, and collimated beams tend to be brought to a focus with respect to that axis at the focal axis. In some cross-cylinder examples, a first and second objective are spaced apart along an optical axis and provide a set of corresponding focal axes which are perpendicular to each other and intersect each other at a focal plane.

In various embodiments, optical components, such as lenses, mounts, housings, etc., are registered to other optical components. Surfaces of two or more optical components can be registered so as to align the corresponding optical components or to align other optical components or beams. Such registration and alignment can occur axially or transversely or in other ways suitable to provide corresponding alignment of optical components and beams. The term "surface" is used in connection with registering optical components, and it will be appreciated surfaces can include other features, including edges, planes, threads, serrations, textures, chamfers, notches, detents, clamping members, etc., and such surfaces can be arranged in orientations other than parallel or perpendicular to different features of optical components.

Figure 1A:
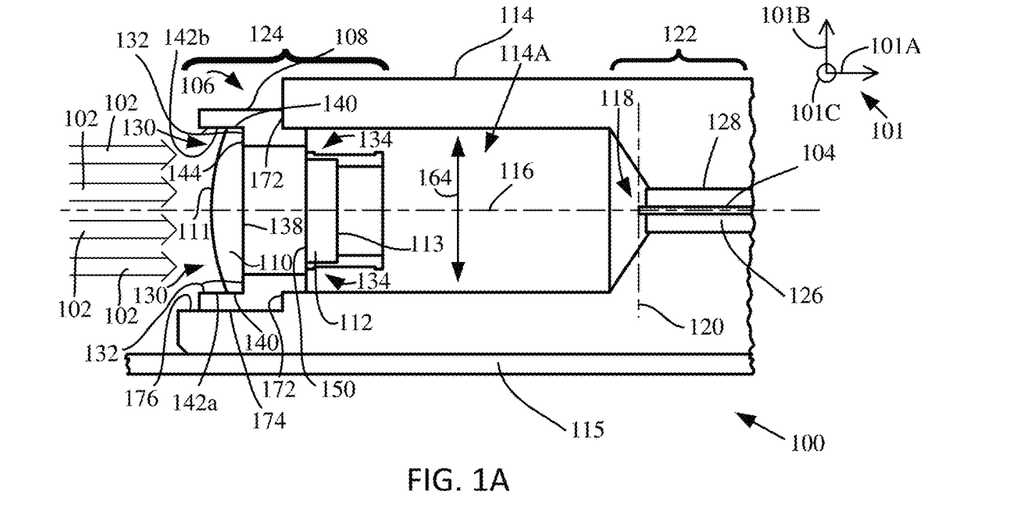
FIG. 1A is a side cross-sectional view of a portion of a passively aligned cross-cylinder lens assembly of a laser diode package suitable for coupling one or more collimated optical beams into an optical fiber.

As shown in FIG. 1A, a coordinate system includes an axis 101A that is along a beam propagation direction, an axis 101B that is along beam fast axes, and an axis 101C (into the plane of FIG. 1A) that is along beam slow axes. In the example of FIG. 1A, the optical beam can have substantially perpendicular fast and slow axes. Referring to FIG. 1A, a laser diode package 100 includes a cross-cylinder objective assembly 106 which receives one or more optical beams 102 propagating along an axis 116 and focuses or directs the optical beams 102 into an optical fiber 104. The optical beams 102 are typically collimated beams having differing beam parameter products along fast and slow axes. The assembly 106 generally includes a lens cell 108 that retains a plano-convex cylindrical fast axis objective (FAO) 110 and a plano-convex cylindrical slow axis objective (SAO) 112. The FAO 110 is selected to focus the beams 102 at a focal plane 120 along the fast axis and the SAO 112 is selected to focus the beams 102 at a focal plane 120 along the slow axis, i.e., such that the focal positions of the FAO 110 and SAO 112 spatially overlap. The assembly 106 further includes an optical mount 114 to which the lens cell 108 is registered and secured.

The FAO 110 and the SAO 112 each generally include a cylindrical convex surface and a plano surface and are registered with the assembly 106 and the optical mount 114 so that the respective plano surfaces are substantially perpendicular to the axis 116 (and the plano surfaces of the lenses are parallel to each other) and centers of curvature of the cylindrically convex surfaces are situated on the axis 116, or nearly so. The assembly 106 includes an outer surface 106A such as a cylindrical surface that is received by an inner bore 114A of the optical mount 114. The inner bore 114a can be generally concentric about the axis 116. An axial displacement of the assembly 106 along the inner bore 114A permits selection of an axial position of the focal plane 120 along the axis 116. The assembly 106 can be registered to the optical mount 114 so that the SAO 112 and the FAO 110, which can be secured to the lens cell 108 before registration of the assembly 106 to the optical mount 114, become aligned with the incident collimated beams 102 in order to focus the beams 102 into the optical fiber 104 at or near the focal plane 120. The optical fiber 104 can be secured in a predetermined position relative to the assembly 106 registered to the optical mount 114 or the optical fiber 104 can be longitudinally translated along an optical fiber insertion path collinear with an optical axis 116 so that a receiving end 118 of the optical fiber can become aligned with a focal plane 120 associated with the registered SAO and FAO.

To generate the collimated optical beams 102, diode laser packages typically include one or more semiconductor diode lasers situated to generate optical beams at one or more wavelengths. The beams 102 are typically directed and processed with various optics so as to form beams 102 which propagate in a parallel, stacked relationship, with beam parameter products optimized in relation to the application, such as coupling into an optical fiber. In typical examples, the collimated optical beams 102 are stacked so that each beam slow axis lies adjacent and spaced apart from each other beam slow axis and so that each beam fast axis is collinear with each other beam fast axis.

Typically, the semiconductor diode lasers are situated so as to produce a plurality of displaced, collimated optical beams 102. Small beam displacements are generally preferred. Diode lasers and corresponding emitting facets can be spaced horizontally and vertically in various ways known in the art and can be reflected and redirected in various ways or with various optics in order to provide beams in one or more two-dimensional closely-packed stacks of parallel collimated beams. The beams 102 are then focused and coupled into the optical fiber 104 so that the coupled laser light can be used for various applications. The numerical aperture of the light successfully coupled into the optical fiber core is generally preserved at the output of the fiber. As diode laser power increases, the higher brightness laser output of the package can be more useful in subsequent applications, such as fiber laser pumping or materials processing. Thus, it is generally desirable to preserve the numerical aperture of the emitted beams to the extent possible in arranging the beams for coupling into the optical fiber.

Diode laser packages are typically housed in a sturdy housing, such as housing 115, which is made of a thermally conductive material, such as copper or another metal or alloy. The diode lasers can be mounted directly to a thermally conductive surface of the housing 115 or on a separate thermally conductive block or blocks. The optical fiber 104 can be terminated in an SMA type connector or other suitable termination that is separate from, forms a part of, or is integrated into the optical mount 114 which can also be separate from, form a part of, or be integrated into the housing 115. The termination of the optical fiber 104 can provide the optical fiber receiving end 118 in a fixed relationship to the incident collimated beams 102 or in a slidable relationship along the optical axis 116 so that the optical fiber receiving end 118 can be situated to receive the beams 102 which become focused therein. In one example, optical mount 114 is formed by machining a solid block of housing material to provide a receiving portion 122 for the optical fiber 104 and a receiving portion 124 for the lens cell 108. In another example, the optical mount 114 is a separate block of material, which can be the same as, or different from, the housing material.

In a representative example, the optical fiber 104 is inserted through a glass ferrule 126 disposed in a bore 128 of the optical fiber receiving portion 122. The glass ferrule 126 inhibits the optical fiber from translating or tilting in relation to the optical axis 116 and can also serve to strip optical modes coupled into the cladding at the optical fiber receiving end 118 and dissipate the energy into the thermally conductive material of the optical mount 114. In other examples, the optical fiber receiving portion 122 can include screw, clip, snap, push-pull, bayonet, or other fiber connector interconnects or corresponding mechanisms suitable for situating the optical fiber receiving end 118 in a predetermined fixed or longitudinally adjustable relationship with respect to the optical axis 116 and the optical mount 114. Longitudinal adjustment along the optical axis 116 can be useful in aligning the optical fiber receiving end 118 with the focal plane 120 associated with the FAO 110 and the SAO 112.

Figure 1B:
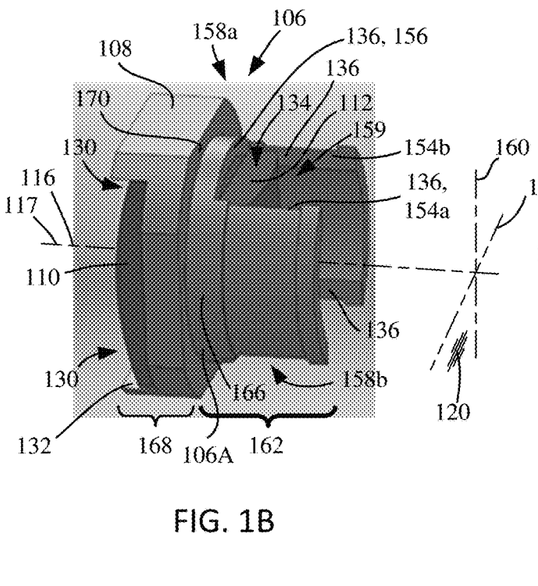
FIG. 1B is a perspective view of a passively aligned cross-cylinder cell with lenses.
Figure 1C:
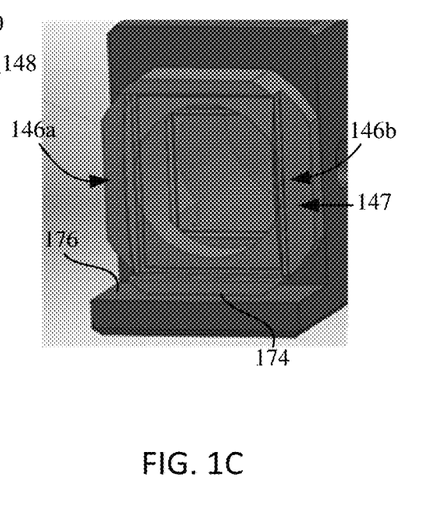
FIG. 1C is a perspective view of a passively aligned cross-cylinder lens assembly.
Figure 1D:
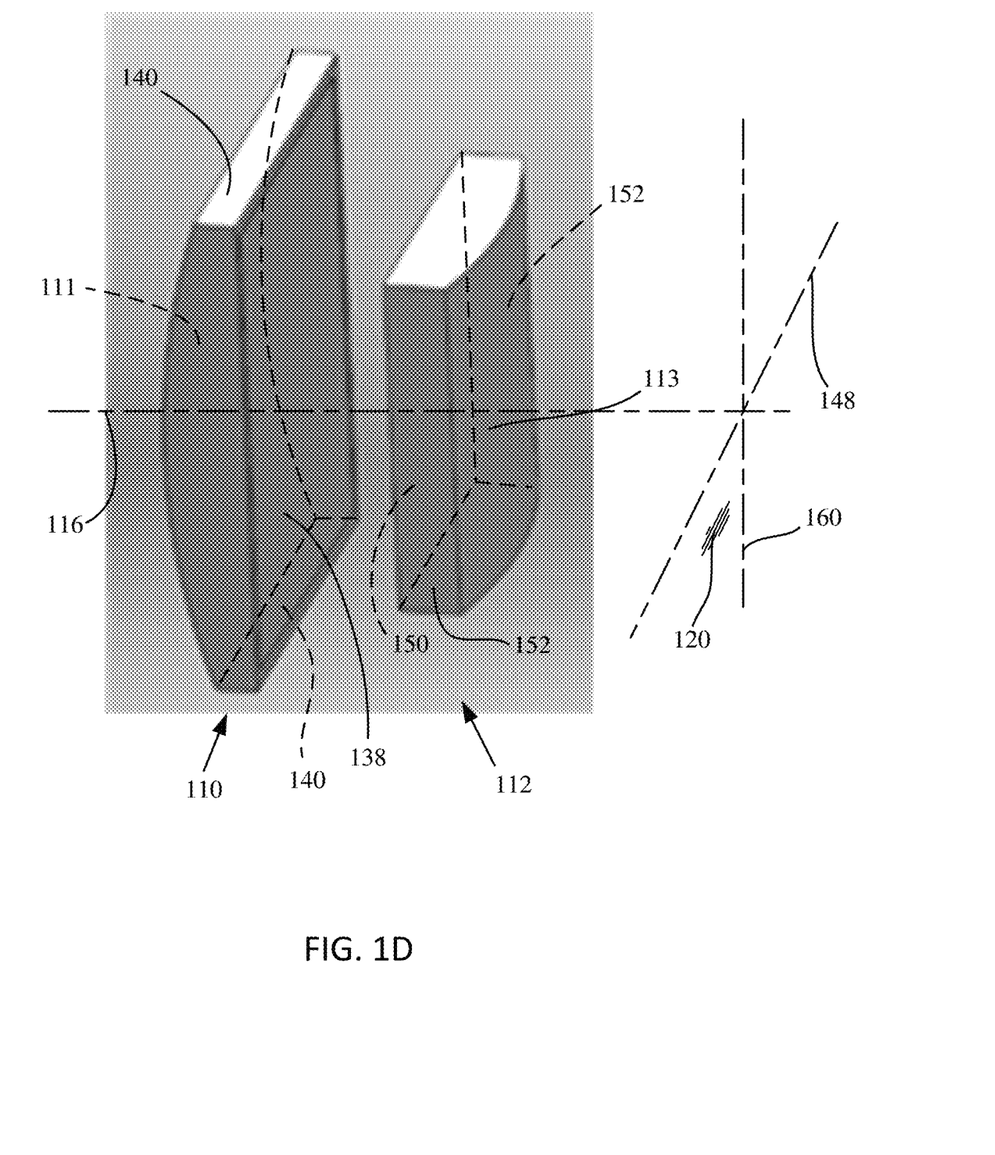
FIG. 1D is a perspective view of a cross-cylinder lens pair with other components removed for clarity.

With additional reference to FIGS. 1B-1D, the lens cell 108 of the cross-cylinder objective assembly 106 includes a fast axis objective receiving portion 130 which can include registering surfaces 132 and a slow axis objective receiving portion 134 which can include registering surfaces 136. The registering surfaces 132, 136 can be used to rotationally align the FAO 110 and SAO 112 about the optical axis 116. A planar optical surface 138 of the FAO 110 and FAO side surfaces 140 can be registered to the registering surfaces 132 so that after subsequent registration of the cross-cylinder objective assembly 106 to the optical mount 114, the FAO 110 is aligned to the optical axis 116. A corresponding lens cell axis 117, as seen in FIG. 1B, is also brought into collinear, or coaxial, alignment with the optical axis 116. In a representative example, the registering surfaces 132 include opposite planar surfaces 142a, 142b separated by approximately the distance between the FAO side surfaces 140, and include a planar back surface 144 which receives the planar optical surface 138 of the FAO 110. Opposite openings 146a, 146b together with the opposite planar surfaces 142 and planar back surface 144 provide a registering slot 147 allowing the FAO 110 to slidably engage the lens cell 108 so that the FAO 110 is translatable parallel to a focal axis 148 of the FAO 110. In another example, openings 146 are replaced with supporting surfaces which can limit translation parallel to the focal axis 148.

With the FAO 110 registered to the fast axis objective receiving portion 130 and the cross-cylinder objective assembly 106 registered to the optical mount 114, the opposite planar surfaces 142a, 142b inhibit the rotation of the FAO 110 about the optical axis 116 and inhibit vertical translation, i.e., movement perpendicular to the focal axis 148. Such constrained movement direction is also parallel to the fast axis of the incident collimated beams 102. The planar back surface 144 also inhibits translation of the optic along the optical axis 116 towards the optical fiber receiving end 118 and rotation about an axis parallel to the focal axis 148 and about an axis mutually perpendicular to the focal axis 148 and optical axis 116. Thus, in a registered position, some or all degrees of freedom of the FAO 110 can be constrained. The FAO 110 can be secured to the receiving portion 130 in various ways, including by applying an epoxy or other suitable adhesive to one or more contacting surfaces or edges such as registering surfaces 132 and applicable surfaces of FAO 110. With the FAO 110 capable of slidable engagement parallel to the focal axis 148, installation in the lens cell 108 can be accomplished more easily. Furthermore, the FAO 110 can be installed prior to the installation of the cross-cylinder assembly 106 in the optical mount 114. With the assembly 106 registered or secured to the optical mount 114, a cylindrical optical surface 111 (shown as a dashed line hidden surface in FIG. 1D) of the FAO 110 faces the incident collimated beams 102 and focuses the beams along the beams' fast axes for coupling into the optical fiber 104.

SAO 112 can include a planar optical surface 150 and side surfaces 152 (as can be seen in FIGS. 1A and 1D) which can be received by the registration surfaces 136 of the SAO receiving portion 134. After subsequent registration of the cross-cylinder objective assembly 106 to the optical mount 114, the SAO 112 is disposed in an aligned relationship to the optical axis 116 and incident collimated beams 102. In a representative example, the registering surfaces 136 include opposite planar surfaces 154a, 154b separated by approximately the distance between the side surfaces 152, and include a planar back surface 156 which receives the planar optical surface 150 of the SAO 112. Opposite openings 158a, 158b together with the opposite planar surfaces 154 and planar back surface 156 provide a registering slot 159 allowing the SAO 112 to slidably engage the lens cell 108 so that the SAO 112 is translatable parallel to a focal axis 160 thereof. Because of the cross-cylinder aspects of the assembly 106, SAO focal axis 160 is generally perpendicular to the FAO focal axis 148 and both are mutually perpendicular to the optical axis 116 with the lens cell 108 registered to the optical mount 114. In another example, openings 158 are replaced with supporting surfaces which can limit translation parallel to the focal axis 160.

In a similar way to the FAO 110, with the SAO 112 registered to the slow axis objective receiving portion 134 and the assembly 106 registered to the optical mount 114, the opposite planar surfaces 154a, 154b inhibit the rotation of the SAO 112 about the optical axis 116 and inhibit horizontal translation, i.e., movement perpendicular to the focal axis 160. Such constrained movement direction is also parallel to the slow axis of the incident collimated beams 102. The planar back surface 156 also inhibits translation of the optic along the optical axis 116 away from the optical fiber receiving end 118 and rotation about an axis parallel to the focal axis 160 and about an axis mutually perpendicular to the focal axis 160 and optical axis 116. Thus, in a registered position, some or all degrees of freedom of the SAO 112 can be constrained.

The SAO 112 can be secured to the receiving portion 134 in various ways, including by applying an epoxy or other suitable adhesive to one or more contacting surfaces such as registering surfaces 136 and applicable surfaces of SAO 112. With the SAO 112 capable of slidable engagement parallel to the focal axis 160, installation in the lens cell 108 can be accomplished more easily with fewer alignment concerns. Furthermore, the SAO 112 can be installed prior to the installation of the cross-cylinder assembly 106 in the optical mount 114. With the assembly 106 registered or secured to the optical mount 114, a cylindrical optical surface 113 of the SAO 112 faces the optical fiber receiving end 118 and focuses the beams 102 along beam slow axes for coupling into the optical fiber 104. Thus, the FAO 110 and SAO 112 can be registered and secured to respective receiving portions 132, 134 of the lens cell 108 such that subsequent installation of the lens cell 108 in the optical mount 114 provides a passive alignment of the incident collimated beams for focusing into the optical fiber 104. The FAO 110 and SAO 112 can each have a rectangular shape so that installation is poka-yoke. That is, the rectangular shape reduces or eliminates the probability that an assembly error occurs since the FAO and SAO 110, 112 will not register in the lens cell 108 when improperly oriented. Registering features of the lens cell 108 can also be made poka-yoke so that the lens cell 108 is registrable to the optical mount 114 with reduced assembly error. In some examples, the lens cell 108 can be inserted only in one direction, or only inserted in one orientation with respect to the axis 116, or inserted in a first orientation and a second orientation rotated 180 degrees about the axis 116 but not at 90 degrees about the axis 116.

In representative examples, five of six degrees of freedom of the respective FAO 110 or SAO 112 are constrained with the sixth degree being associated with a degree of freedom that may or may not need to be constrained for alignment, such as being parallel to a corresponding focal axis. In other examples, different numbers of constrained degrees of freedom are possible. Through passive alignment, fewer or no adjustments are made to optical components in order to optimize or achieve desired outcomes. For example, in actively aligned optical configurations, lens optics, such as focusing objectives, are tilted, turned, translated, etc., by a technician until a suitable outcome is achieved in relation to diagnostic or other monitoring equipment. For passively aligned optics, diagnostic equipment may still be used though typically only to monitor the result without provision for closed-loop feedback.

With the FAO 110 and SAO 112 registered and secured to the lens cell 108, the cross-cylinder objective assembly 106 can be registered to the lens cell receiving portion 124 of the optical mount 114. The lens cell 108 can be conveniently fabricated from metal tube or rod and can include an annular portion 162 which is insertable into an aperture 164 of the lens cell receiving portion 124 that is coaxial with the optical axis 116. At least a portion of the annular portion 162 has a diameter approximately the same as the aperture 164 so that a registering surface 166 on the annular portion 162 is provided which can be registered to a surface of the aperture 164. The annular portion 162 registered to the aperture 164 inhibits translation of the lens cell 108 adjacent to the optical axis 116 and rotations that are not about the optical axis 116.

The lens cell 108 also includes a larger lens cell portion 168 which can also be annular and which includes a registering surface 170 perpendicular to the optical axis 116 that inhibits further insertion of the lens cell 108 into the aperture 164 through registration with an insertion stopping surface 172 of the lens cell receiving portion 124. By inhibiting further insertion, the objectives 110, 112 are inhibited from translating farther along the optical axis 116. The distances from the respective objectives to the registering surface 170 can determine the position of the focal plane 120 associated with the objectives. Thus, registering surface 170 can provide a reference datum for distancing the lens cell 108 and corresponding objectives 110, 112 in relation to the optical fiber receiving end 118.

For example, the larger lens cell portion 168 can be extended or shortened along the optical axis 116 so that the planar back surface 144 is positioned farther from or closer to the optical fiber receiving end 118 when the assembly 106 is registered to the optical mount 114. An FAO 110 with a corresponding longer or shorter focal length can then be used based on the extension or truncation providing the planar back surface 144 or other registering surface at a corresponding selected offset from the registering surface 170. Annular portion 162 can also be extended or shortened along the optical axis 116 so that the planar back surface 156 is positioned closer to or farther from the optical fiber receiving end 118. An SAO 112 with a corresponding shorter or longer focal length can then be used based on the extension or truncation providing the planar back surface 156 or other registering surface at a corresponding selected offset from the registering surface 170. To maintain common features between optical mounts 114, lens cell variations and corresponding objectives can be configured to provide the focal plane 120 in approximately the same position along the optical axis 116, though it will be appreciated that different positions are also possible. In some examples, different optical mounts 114 can be used with different corresponding distances specified between insertion stopping surface 172 and a nominal location for the optical fiber receiving end 118.

The lens cell 108 also includes a registration surface 174 situated to inhibit rotation of the lens cell 108 about the optical axis 116 when registered to the lens cell receiving portion 124. The lens cell receiving portion 124 includes a registration surface 176 which contacts the registration surface 174 to inhibit rotation of the lens cell 108 relative to the optical mount 114. For larger lens cell portions 168 which are annular, the registration surface 174 can be formed by machining flat a portion of the annular surface of the larger lens cell portion to correspond to registration surface 176.

Figure 2A:
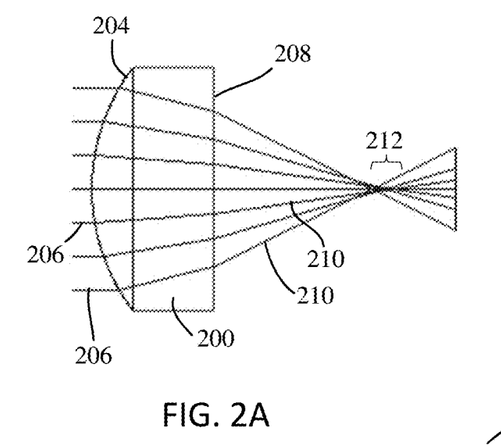
FIGS. 2A & 2B are ray traces of a convex lens oriented oppositely with respect to an optical axis.
Figure 2B:
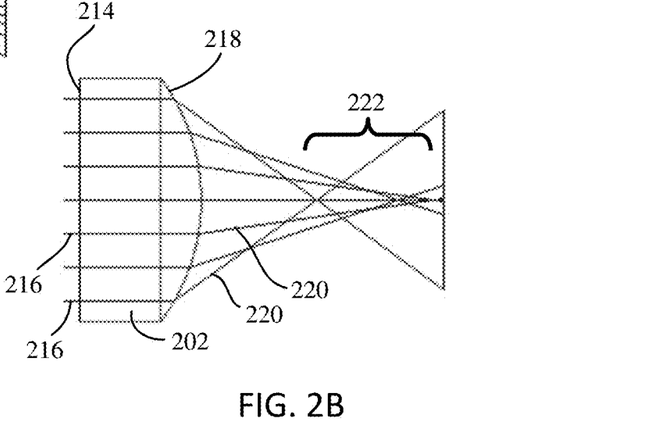

In FIGS. 2A and 2B a pair of plano-convex lenses 200, 202 are viewed from the side. Lens 200 is oriented with a convex surface 204 facing incident parallel rays 206 and a planar surface 208 facing convergent rays 210. The convergent rays 210 come to a focus 212 with a relatively small degree of spherical aberration. The orientation of lens 200 is generally termed "flat-to-focus" which is associated with a corresponding reduced amount of spherical aberration. Lens 202 is oriented oppositely, such that a planar surface 214 faces incident parallel rays 216 and a convex surface 218 faces departing convergent rays 220. The corresponding focus 222 illustrates substantial spherical aberration, as is generally eschewed by those with skill in the art. While the lenses 200, 202 are relatively thick so as to exaggerate the aberrative effect associated with the orientation of the convex surface, such effects persist to some degree in the thin lens regime as well.

Figure 3A:
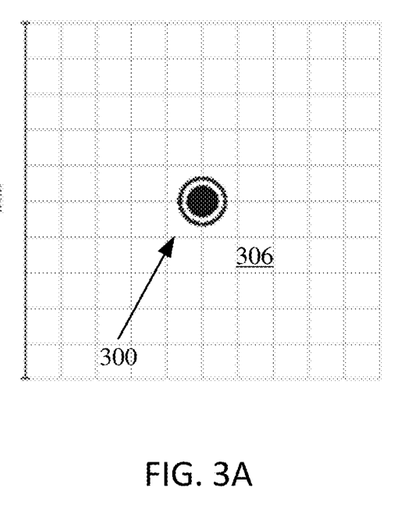
FIGS. 3A & 3B are image plane irradiance maps for convex lenses corresponding to FIGS. 2A & 2B, respectively.
Figure 3B:
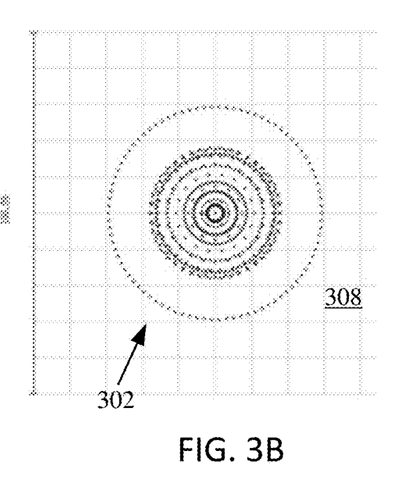

FIGS. 3A and 3B illustrate focused spots 300, 302 for beams focused by plano-convex optics with thin lens characteristics. Spot 300 is generated by a plano-convex optic oriented flat-to-focus and, at a focused image plane 304 of the beam or beams, most of the beam power is contained within a circle of about 20 μm diameter. Spot 302 is generated by a plano-convex optic oriented convex-to-focus and, at a focused image plane 306 of the beam or beams, most of the beam power is contained within a circle of about 60 μm diameter. While the power enclosure is degraded considerably, all power remains contained within a 100 μm boundary associated with an multimode optical fiber core. To provide the optic oriented convex-to-focus with suitable power enclosure characteristics for coupling into a multimode fiber, it can be advantageous to use high index glass for the optic, such as glass with a refractive index of 1.7 or larger. The optic should be kept relatively thin, such as having a maximum thickness of about 2 mm or less, and the focal length of the optic should be more than about three times the diameter of the incident collimated beam or beams. A balance can be achieved between the aberrative effects caused by the convex-to-focus orientation and suitable power enclosure associated with coupling beams into the optical fiber.

In some examples, the SAO 112 is disposed convex-to-focus such that the convex surface 113 thereof faces the optical fiber receiving end 118. The SAO 112 is situated to receive incident beams 102 which are focusing with respect to the fast axes of the beams 102 due to propagation through the FAO 110 and are collimated with respect to the slow axes of the beams. Orienting the SAO 112 convex-to-focus can simplify manufacture of the lens cell 108 and allow greater convenience in construction of the cross-cylinder assembly 106. Furthermore, the aberration associated with the unconventional convex-to-focus approach produces an image blur associated with the slow axis (or whichever optic is oriented convex-to-focus) which reduces peak irradiance at the image plane. This smoothing effect can improve reliability of the package 100 as the optical fiber receiving end 118 is exposed to a reduced peak intensity and can also improve homogenization attributes at the output of the optical fiber 104. In some examples a reduction in peak irradiance at the optical fiber receiving end 118 of about 1% is achieved, though other amounts are possible depending on the characteristics of the incident beams 102 and optical components, such as objectives 110, 112, focusing them.

Figure 4A:
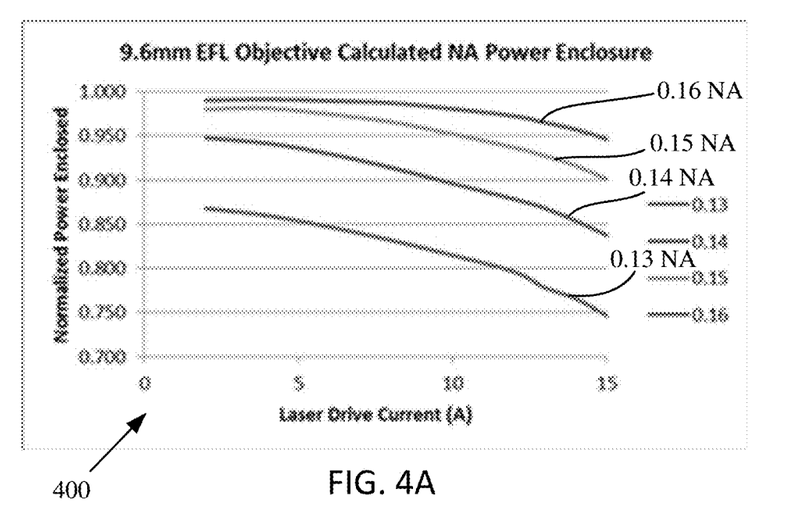
FIGS. 4A & 4B are plots of power enclosure for different numerical apertures.
Figure 4B:
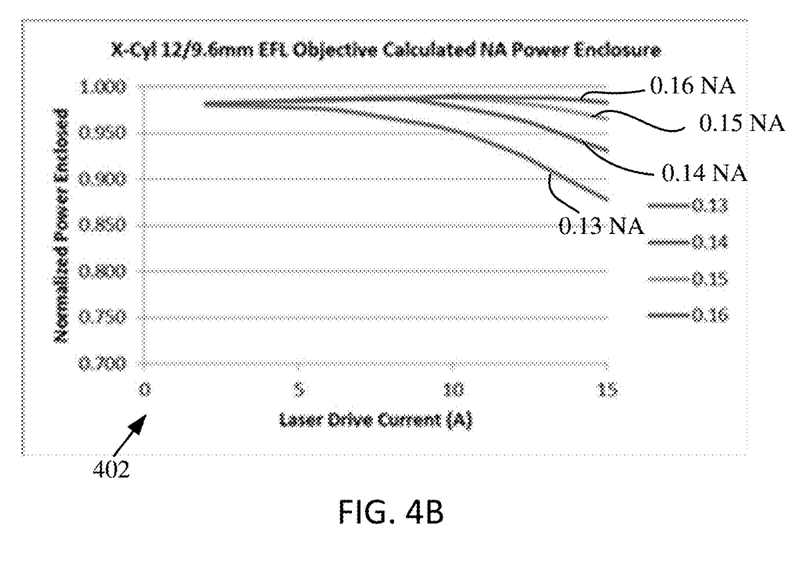

FIGS. 4A and 4B are plots 400, 402 of beam power enclosure in the optical fiber receiving end 118 for different numerical apertures associated with beams 102 focused therein. In plot 400, a diode laser package generates laser beams from a plurality of approximately 100 μm broad area laser diodes and collimates and stacks the beams which are then received by a plano-convex objective with a 9.6 mm focal length. The single plano-convex objective focuses the plurality of incident collimated laser beams into a 105 μm core of an optical fiber mounted to the package. The power coupling of the beams into the core of the optical fiber generally decreases as the diode lasers are driven to higher output powers with higher driving currents. Also, the amount of power coupled into the core associated with a particular numerical aperture decreases as the numerical aperture decreases. For example, using the single plano-convex objective, the amount of light within 0.13 NA coupled into the 105 μm fiber core is between about 74% and 87% total beam power, whereas the amount of light within 0.16 NA coupled into the 105 μm fiber is between about 94% and 98% total beam power depending on driving current. Since lower NA can be useful for a variety of applications, the power offset and drop-off for lower numerical apertures can be undesirable. In plot 402, a similar plurality of collimated, stacked laser beams is received by a cross-cylinder lens assembly in accordance with examples herein which replaces the single plano-convex objective. The assembly includes an FAO with a 12 mm focal length and an SAO with a 9.6 mm focal length. By including the longer focal length FAO, the power coupling for light within 0.13 NA is between about 88% and 98% for the same driving currents applied in plot 400, resulting in a substantial improvement in NA performance over the single plano-convex lens configuration.

The cross-cylinder assembly 106 can be configured as a modular assembly. The FAO 110 and SAO 112 are held in the lens cell 108 in an orientation passively aligned to the optical fiber 104 and incident collimated beams 102. The assembly 106 is mounted to an optical mount 114 that can be common across several types of diode laser packages, including package 100. For example, different packages may include different numbers of diode laser emitters, different step heights between emitters, different optical fiber core sizes, different numerical apertures, diode lasers with different slow or fast axis brightness, different apertures, different output powers, etc. Depending on the different characteristics of the diode laser package, suitable focal lengths for the FAO and SAO may vary accordingly. Modular lens cells 108 can vary registration or reference surfaces, such as insertion stopping surface 170 and planar back surfaces 144, 156 to shorten or extend relief distances to correspond to focal length adjustments for the different packages.

Figure 5A:
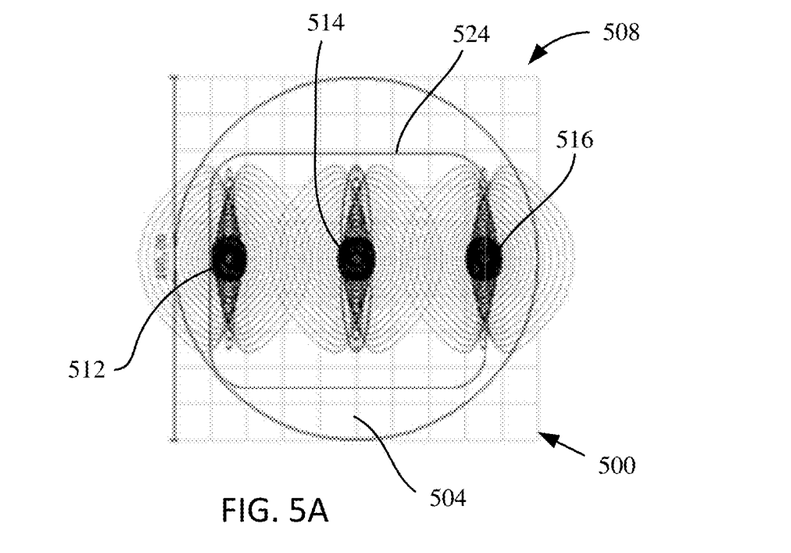
FIGS. 5A & 5B are spot diagram maps of optical field intensity at a fiber face.
Figure 5B:
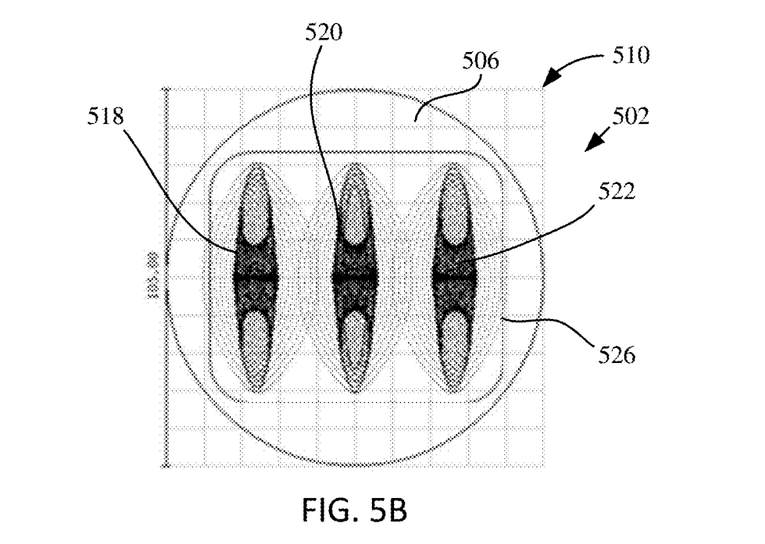

FIGS. 5A and 5B are maps 500, 502 of optical field intensity at a core 504, 506 of an optical fiber receiving end 508, 510 suitable for use in an optical mount of a diode laser package. Map 500 shows field intensity at left 512, middle 514, and right hand side 516 associated with a slow axis of a beam or beams coupled into the fiber receiving end 508 with a single spherical plano-convex objective. Map 502 shows optical field intensity at similar left 518, middle 520, and right hand side 522 positions on the optical fiber receiving end 510 using a cross-cylinder objective assembly. As can be seen from map 500, an optical beam extends horizontally, i.e., in the direction of the beam slow axis, outside of a power enclosure rectangle 524 and is well contained vertically, i.e., in the direction of the beam fast axis, inside of the power enclosure rectangle 524. In map 502, the different focal lengths of the respective fast and slow axis objectives of the cross-cylinder objective assembly focus the beams onto the receiving end 510 so that the beam power is well contained within a power enclosure rectangle 526 both along the slow and fast axes and without over-focusing the beams along the fast axis. By using the cross-cylinder objective assembly, the beam spot size at the core 506 can be expanded in the vertical axis direction and traded for improvement in numerical aperture.

Figure 6:
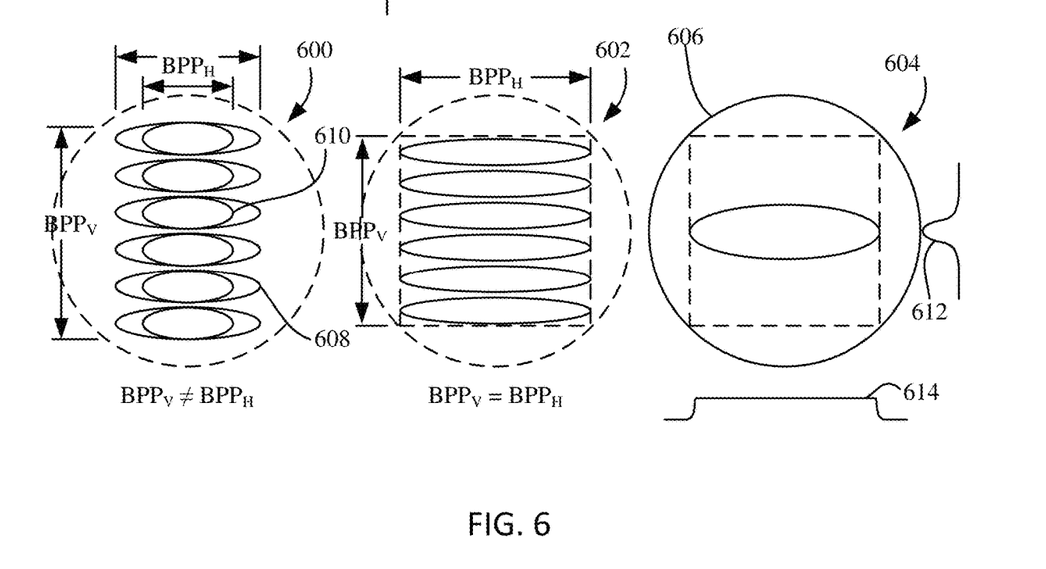
FIG. 6 is a map of beam parameter product associated with different optics and the effect of the beams at a fiber face.

FIG. 6 shows cross-sectional views 600, 602, 604 of optical beams being focused by an FAO and an SAO of a cross-cylinder assembly to an optical fiber receiving end 606. In view 600, a stack of six collimated beams 608 emitted by respective broad area laser diodes is shown in cross-section at the FAO of a selected focal length. The beams 608 have a characteristic vertical and horizontal bpp. An additional stack of six collimated beams 610 emitted by flared laser diodes is overlaid on the beams 608 and are shown to have a characteristic vertical and horizontal bpp, with a horizontal bpp being narrower than the counterpart beams 608. For each set of beams 608, 610, the vertical and horizontal bpps of the set are not equal. In view 602, the beams 608, 610 are shown in cross-section at the SAO having a selected focal length which corresponds to one or the other set of beams 608, 610.

The separate focal lengths of the SAO different from the FAO focal lengths allow the horizontal and vertical bpps of beams 608 to be equal and of beams 610 to be equal in order to enhance coupling of the beams 608 or 610 into the optical fiber receiving end 606. Different cross-cylinder assemblies having different selected FAOs or SAOs can be registered to the same or a similar optical mount so that diode lasers of different bpp characteristics can be used in different diode laser packages without substantially changing package requirements. In convenient examples, optical mount architecture, beam combining architectures, and diode laser mount architectures can be kept common among various diode laser packages. View 604 shows the beams 608, 610 focused at the optical fiber receiving end 606. Typical intensity profiles after focus through the focusing optics is shown by distribution 612 for the fast axis and distribution 614 for the slow axis.

Figure 7:
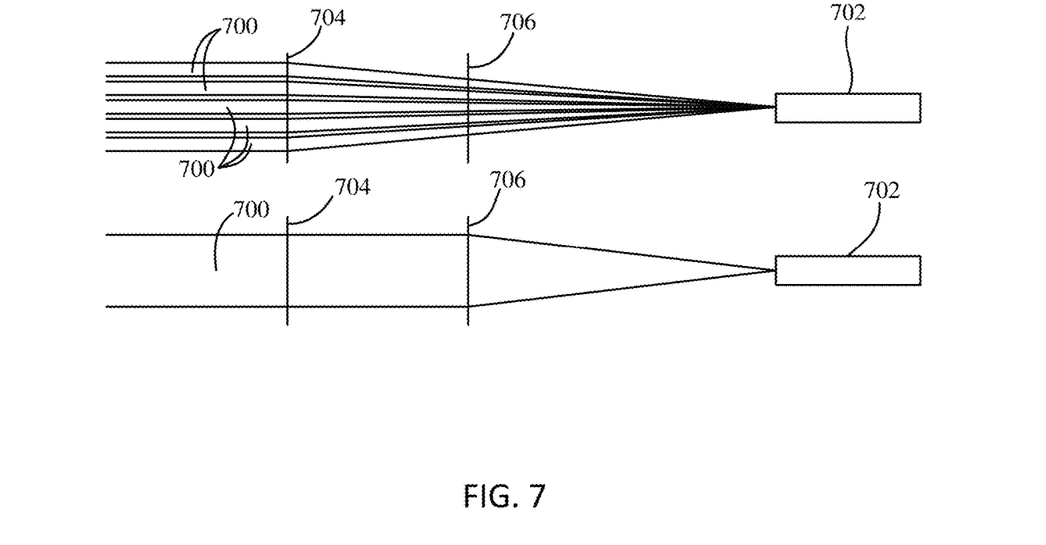
FIG. 7 is a ray trace schematic for beams coupled into a fiber face generally depicting fast axes in the top view and slow axes in the bottom view.

In FIG. 7, orthogonal side-views are shown of a plurality of collimated beams 700 stacked in the direction of the fast axes of the beams and incident upon and being coupled into an optical fiber 702. In the top side-view, the plurality of beams 700 are received by an FAO 704 which focuses the fast axes of the beams 700, which are generally in the vertical direction in the top side-view, for coupling into the optical fiber 702. In the bottom side-view, at a position closer to the optical fiber 702, an SAO 706 receives the beams 700 which have not yet been focused along the slow axis, the slow axis being generally in the vertical direction in the bottom side-view, and focuses the beams 700 along the slow axis into the optical fiber 702. Focal length considerations for the FAO 704 can include the number of emitters, the step height between emitters, fast axis collimator focal lengths, and core diameter of the optical fiber 702. Focal length considerations for the SAO 706 can include emitter aperture width, slow axis collimation focal lengths, and core diameter of the optical fiber 702.

Figure 8:
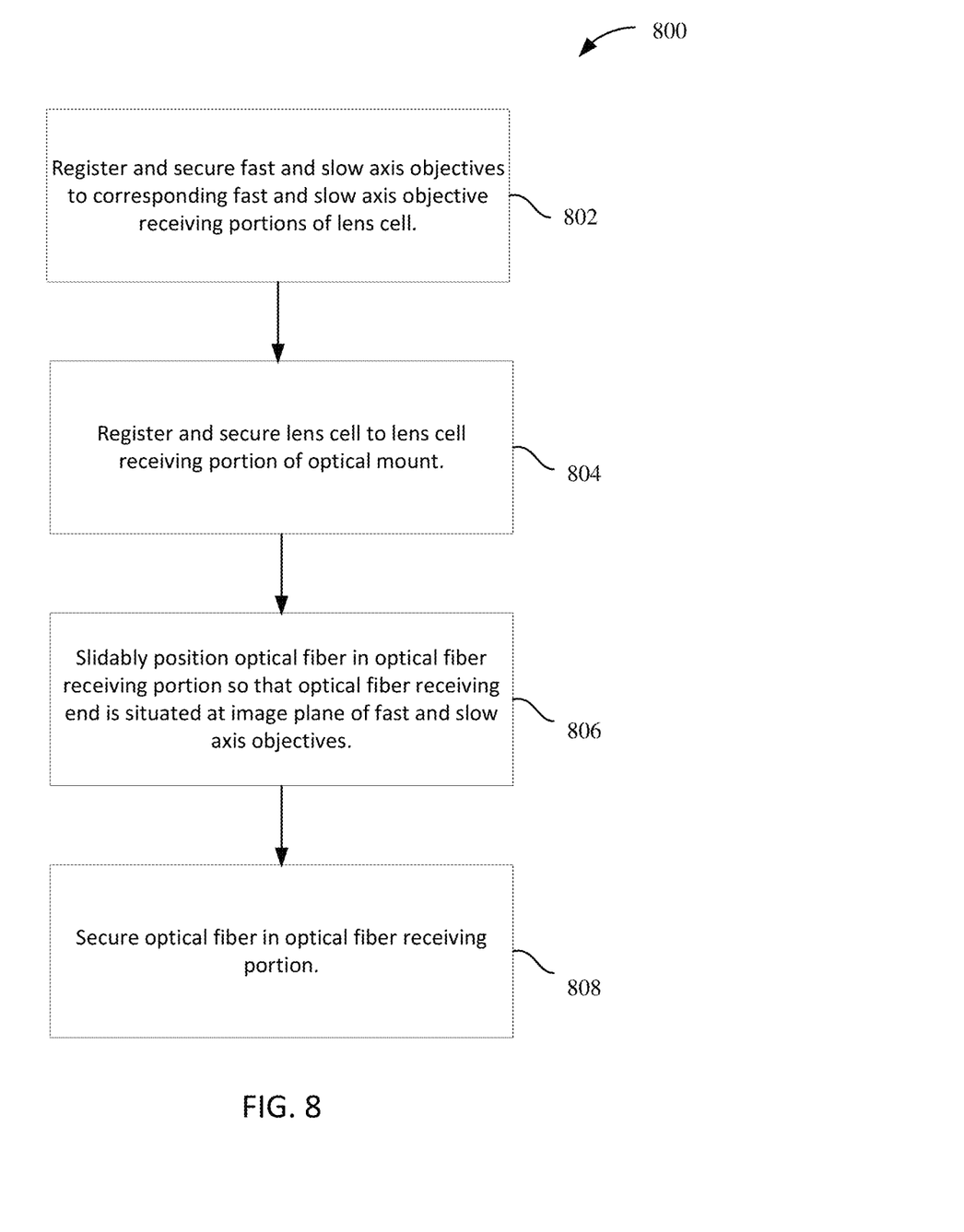
FIG. 8 is a flowchart of a method of passively aligning collimated beams to an optical fiber.

With reference to FIG. 8, an optical coupling method 800 includes at 802, registering and securing a fast axis objective (FAO) and a slow axis objective (SAO) to corresponding FAO and SAO receiving portions of a lens cell. At 804, the lens cell with attached objectives is registered and secured to a receiving portion of an optical mount. The registered objectives and lens cell provide incident collimated beams in passive alignment for focusing at an image plane. At 806, an optical fiber is secured in a receiving portion of the optical mount. In some examples, the optical fiber is secured in a predetermined position corresponding to the image plane of the objectives in the lens cell. In further examples, at 805, the optical fiber is slidably positioned so that an optical fiber receiving end lies at the image plane of the secured lens cell and is secured in the aligned position.

In view of the many possible embodiments to which the principles of the disclosed technology may be applied, it should be recognized that the illustrated embodiments are only preferred examples and should not be taken as limiting the scope of the disclosure. Alternatives specifically addressed in these sections are merely exemplary and do not constitute all possible alternatives to the embodiments described herein. For instance, various components of apparatuses described herein may be combined in function and use. We therefore claim all that comes within the scope and spirit of the appended claims.

We claim:

1. A cross-cylinder objective assembly, comprising:
   a cylindrical fast axis objective (FAO) situated along an optical axis for focusing an incident laser beam along a fast axis;
   a cylindrical slow axis objective (SAO) situated along the optical axis for focusing the incident laser beam along a slow axis orthogonal to the fast axis;
   a lens cell comprising a first portion having a first internal diameter and a second portion having a second internal diameter larger than the first internal diameter, the lens cell having fast and slow axis objective receiving portions for registering the FAO and SAO at a predetermined spacing along the optical axis, the second portion of the lens cell having a non-circular shape in cross-section such that a side portion of the second portion is configured as a registering surface; and
   an optical mount defining a bore into which at least the first portion of the lens cell extends, the optical mount comprising a corresponding registering surface that engages the registering surface of the lens cell to inhibit rotation of the lens cell relative to the optical mount.

2. The cross-cylinder objective assembly of claim 1, wherein the optical mount comprises a fiber receiving portion configured to situate an optical fiber receiving end along the optical axis at a predetermined spacing from the lens cell so that the incident laser beam is coupled into the optical fiber receiving end.

3. The cross-cylinder objective assembly of claim 1, wherein the SAO has a convex cylindrical surface facing the direction of focus produced by the SAO along the optical axis.

4. The cross-cylinder objective assembly of claim 3, wherein the SAO is situated to produce a spherical aberration blur associated with the focusing of the incident laser beam along the slow axis.

5. The cross-cylinder objective assembly of claim 1, wherein the registered FAO is translatable parallel to a FAO focal axis and the registered SAO is translatable parallel to a SAO focal axis.

6. The cross-cylinder objective assembly of claim 1, wherein:
   the bore includes an insertion surface that registers against a corresponding insertion surface of the lens cell and inhibits translation of the lens cell along the optical axis relative to the optical mount.

7. A method, comprising:
   selecting a lens cell from a plurality of different lens cells, each lens cell including a registering surface configured to engage a corresponding registering surface of a common optical mount associated with an optical axis to inhibit rotation of the lens cell relative to the optical axis, a fast axis objective (FAO) receiving portion for registering and securing an FAO to the lens cell, and a slow axis objective (SAO) receiving portion for registering and securing an SAO to the lens cell such that a focal axis of the SAO is orthogonal to a focal axis of the FAO, a portion of each lens cell having a non-circular shape in cross-section such that a side portion of each lens cell is configured as a registering surface;
   wherein each lens cell is different from each other lens cell by one or more of a spacing between the FAO receiving portion and the optical mount registering portion along the optical axis and a spacing between the SAO receiving portion and the optical mount registering portion along the optical axis.

8. The method of claim 7, further comprising:
   registering and securing an FAO and SAO in the respective receiving portions of the selected lens cell.

9. The method of claim 8, further comprising:
   inserting the selected lens cell within a bore of the optical mount such that the corresponding registering surfaces engage one another.

10. The method of claim 9, further comprising:
    positioning an optical fiber receiving end within the bore of the optical mount along the optical axis at or near the intersection of an SAO focal axis and an FAO focal axis.

11. The method of claim 10 further comprising:
directing at least one collimated beam parallel to the optical axis and to the lens cell so that the fast and slow axes of the at least one collimated beam are focused into the optical fiber receiving end via the FAO and SAO.

12. The method of claim 7, wherein a spacing between an FAO receiving portion and an optical mount registering portion of a first lens cell of the plurality of different lens cells that is larger than a spacing between an FAO receiving portion and an optical mount registering portion of a second lens cell of the plurality of different lens cells corresponds to a longer focal length of an FAO associated with the first lens cell than a focal length of an FAO associated with the second lens cell.

13. The method of claim 10, wherein registering and securing the SAO includes positioning the SAO having a plano surface and a convex surface so that the convex surface faces the intersection.

14. The method of claim 8, wherein the registered FAO is translatable in a direction parallel to an FAO focal axis and the registered SAO is translatable in a direction parallel to an SAO focal axis.

15. The method of claim 7, wherein the lens cell includes an annular portion insertable into a lens cell aperture of the optical mount and registrable to a lens cell aperture surface of the optical mount for inhibiting translation of the lens cell transverse to the optical axis, and a lens cell insertion limiting surface registrable to an optical mount insertion limiting surface for inhibiting translation of the lens cell along the optical axis.

16. A diode laser package, comprising:
a mount comprising a lens cell receiving portion, a fiber receiving portion opposite the lens cell receiving portion, and a focusing volume extending between the lens cell and fiber receiving portions, the portions associated with an optical axis and defining respective apertures corresponding to the optical axis;
an optical fiber secured in relation to the fiber receiving portion aperture so that an input face of the optical fiber is situated in the focusing volume at a selected position along and coaxial about the optical axis;
a lens cell coupled to the lens cell receiving portion of the mount, a portion of the lens cell having a non-circular shape in cross-section such that a side portion of the lens cell is configured as a registering surface that engages a corresponding registering surface of the mount so as to inhibit rotation of the lens cell about the optical axis and an insertion surface that engages a corresponding insertion surface of the mount to inhibit translation of the lens cell in one or both directions along the optical axis, the lens cell including a fast axis objective (FAO) receiving portion and a slow axis objective (SAO) receiving portion;
an FAO having an FAO focal axis and registered to the FAO receiving portion so as to inhibit rotation of the FAO in relation to the optical axis and to inhibit translation of the FAO in one or both directions along the optical axis and perpendicular to the FAO focal axis; and
an SAO having an SAO focal axis orthogonal to the FAO focal axis and registered to the SAO receiving portion so as to inhibit rotation of the SAO in relation to the optical axis and to inhibit translation of the SAO in one or both directions along the optical axis and perpendicular to the SAO focal axis.

17. The diode laser package of claim 16, wherein the FAO and SAO are situated to receive at least one collimated laser beam propagating parallel to the optical axis and to focus the beam into the input face of the optical fiber.

18. The apparatus of claim 16, wherein a convex surface of the SAO faces the optical fiber input face.

19. The apparatus of claim 16, wherein the registered FAO is translatable parallel to the FAO focal axis and the registered SAO is translatable parallel to the SAO focal axis.

20. The apparatus of claim 1, wherein the FAO and the SAO are situated to focus at a common focal location.

21. The apparatus of claim 1, wherein the FAO and the SAO have respective cylindrical surfaces arranged perpendicular to one another.

* * * * *